United States Patent [19]

Egli

[11] 4,153,077
[45] May 8, 1979

[54] HOT AND COLD WATER MIXING VALVE

[75] Inventor: Werner Egli, Eglisau, Switzerland

[73] Assignee: Armaturenfabrik Wallisellen AG, Wallisellen, Switzerland

[21] Appl. No.: 761,028

[22] Filed: Jan. 21, 1977

Related U.S. Application Data

[63] Continuation-in-part of Ser. No. 700,363, Jun. 28, 1976, abandoned.

[30] Foreign Application Priority Data

Jun. 30, 1975 [CH] Switzerland .................. 8476/75

[51] Int. Cl.$^2$ .............................................. F16K 11/02
[52] U.S. Cl. .................................. 137/625.17; 251/285
[58] Field of Search ...................... 137/625.17, 625.41; 251/287, 314, 309, 285

[56] References Cited

U.S. PATENT DOCUMENTS

| | | | |
|---|---|---|---|
| 375,508 | 12/1887 | Rodman | 137/625.17 |
| 1,016,064 | 1/1912 | Brocke | 251/285 |
| 1,169,090 | 1/1916 | Lucke | 137/625.17 |
| 3,026,907 | 3/1962 | Klingler | 137/625.17 |
| 3,066,908 | 12/1962 | Floren et al. | 251/187 |
| 3,133,723 | 5/1964 | Goldman et al. | 251/309 |
| 3,166,097 | 1/1965 | Hinderer et al. | 137/625.41 |
| 3,257,096 | 6/1966 | Floren et al. | 251/287 |
| 3,354,910 | 11/1967 | Moen | 137/625.17 |
| 3,533,443 | 10/1970 | Jones | 137/625.17 |
| 3,726,317 | 4/1973 | Moen | 137/625.17 |
| 3,955,598 | 5/1976 | Knapp | 137/625.17 |

Primary Examiner—William R. Cline
Attorney, Agent, or Firm—Sughrue, Rothwell, Mion, Zinn and Macpeak

[57] ABSTRACT

A hot and cold water mixing valve has the supply lines and the out flow discharge substantially radially and open to a median portion of the housing bore in such a way that the flow component of the water which flows between the supply lines and the out flow is greater in a transverse direction with respect to the housing bore than in an axial direction thereto with a part of the control plunger which is located in the median portion comprising a peripheral recess and being equipped with sealing ribs on both sides with adjustable limit means limiting the movement of the plunger, whereby axial displacement of the control plunger controls the mixing ratio or controls the delivery quantity.

8 Claims, 16 Drawing Figures

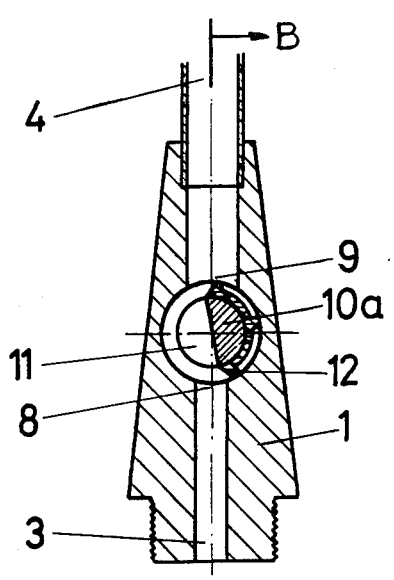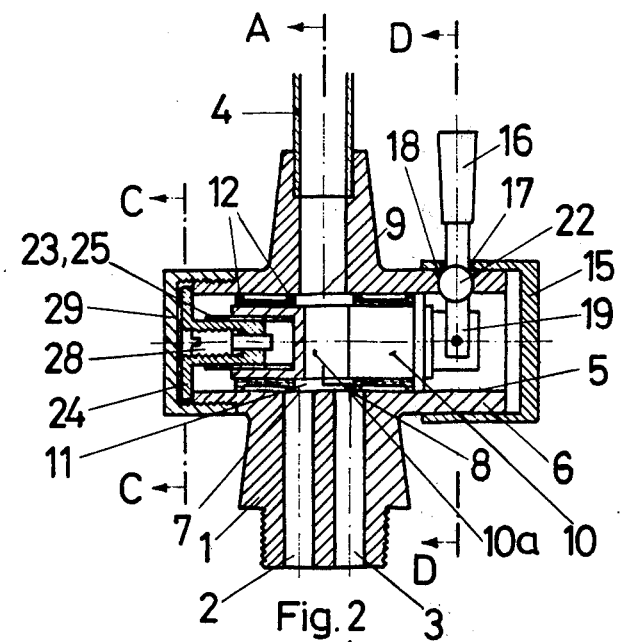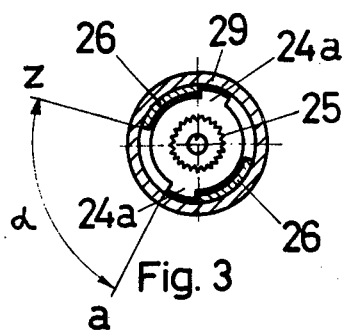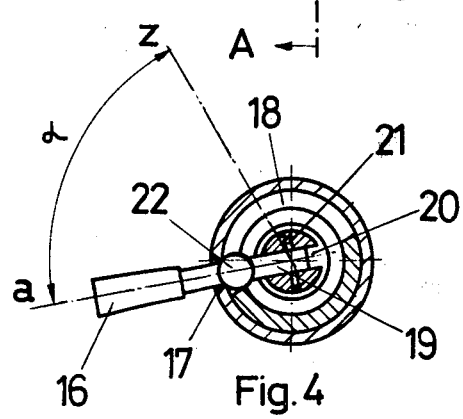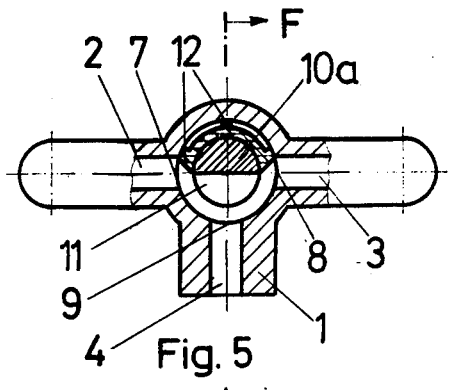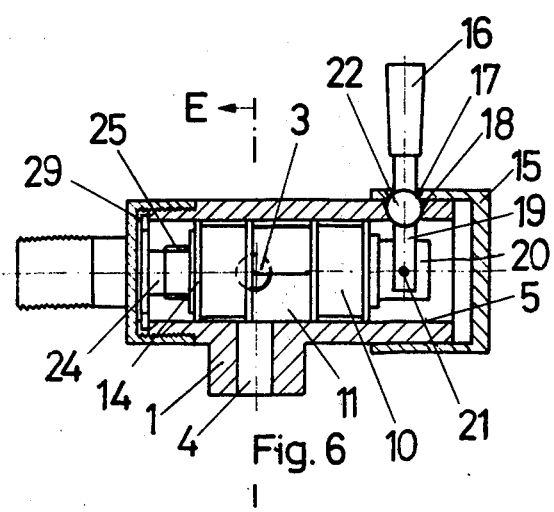

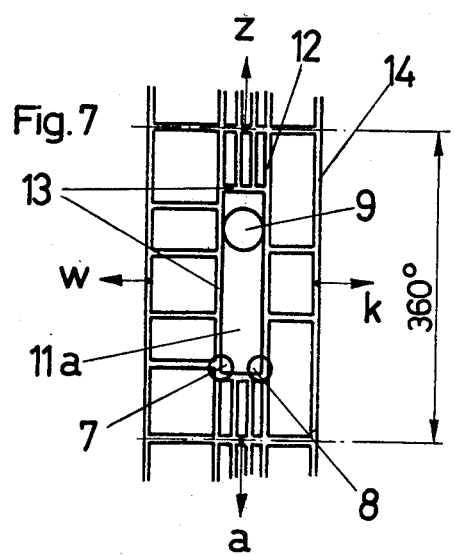
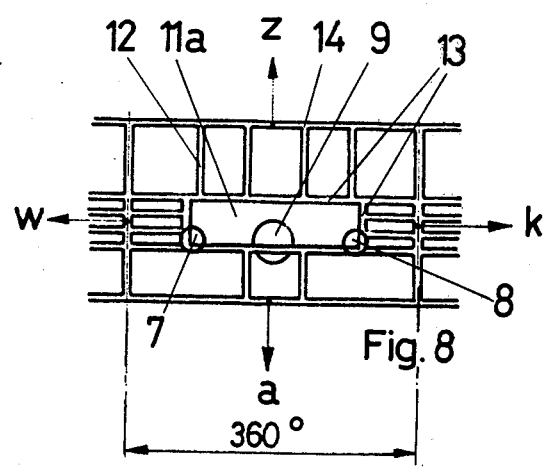
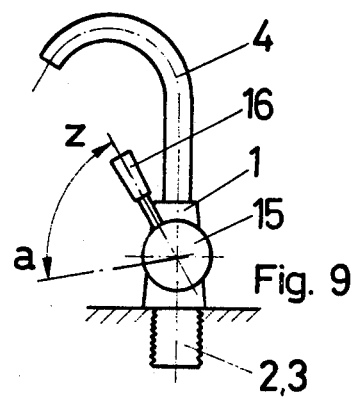
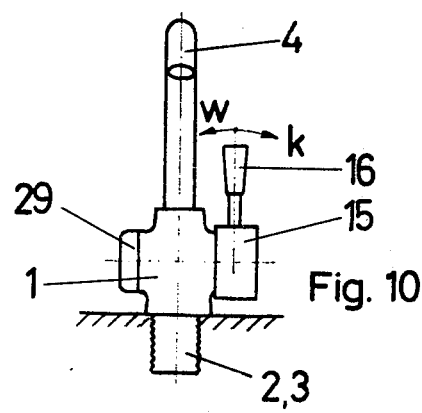
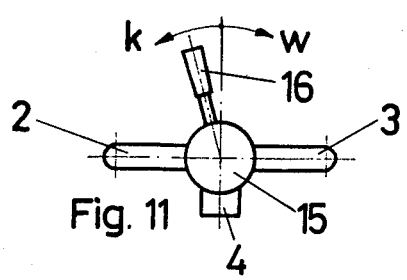
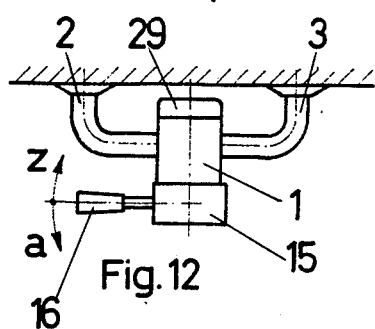

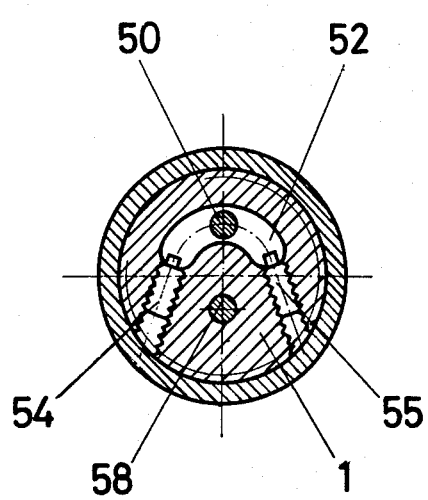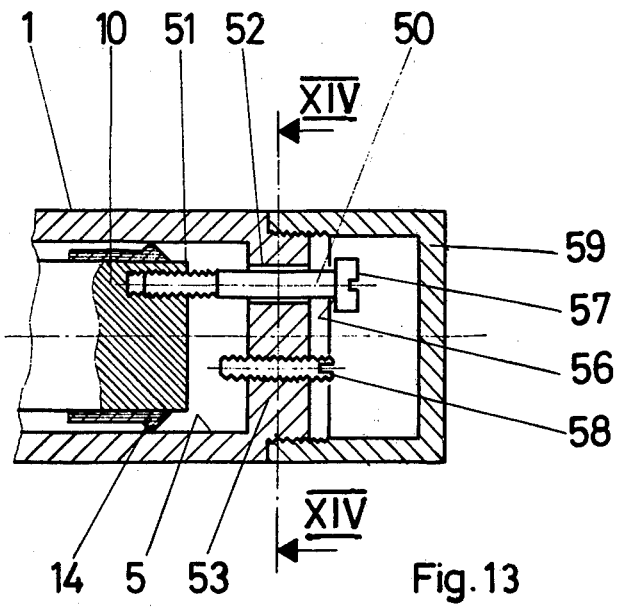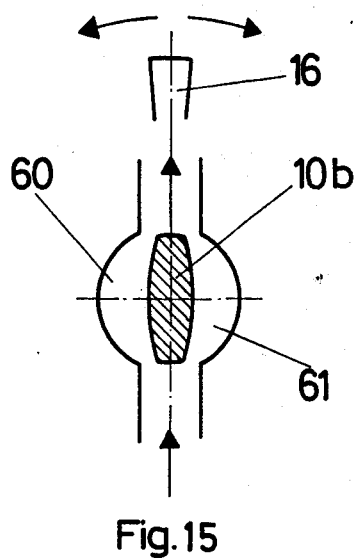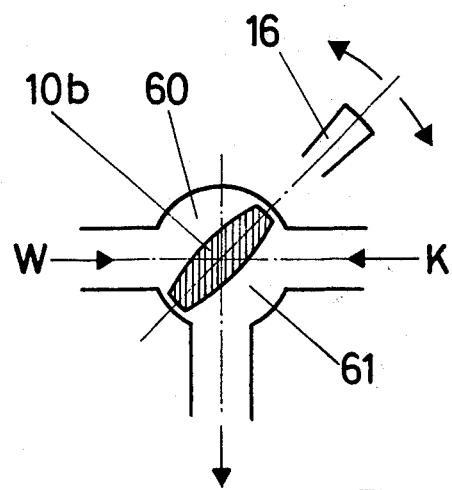

HOT AND COLD WATER MIXING VALVE

This application is a continuation-in-part application of Ser. No. 700,363 filed June 28, 1976, now abandoned.

BACKGROUND OF THE INVENTION

1. Field of the Invention

The present invention relates to a mixing valve for hot and cold water comprising a housing unit with two supply lines and an outflow and a control means for regulating the delivery quantity and delivery temperature; a control plunger disposed in a housing bore being limitedly axially displaceable and rotatable as a result of actuation of the afore-mentioned control member.

2. Description of the Prior Art

Mixing valves of this type are already known. Many of the known devices have a very complicated structure owing to the use of conventional valve packings and furthermore, their plunger systems are not universally applicable.

Mixing valves are also known wherein the hot and cold water enters the housing bore radially and the mixed water leaves the control plunger in an axial direction. As a result, a fixed function must be assigned to each movement of the control plunger. The axial movement of the control plunger is generally used for quantity control and its rotational movement for temperature control. Accordingly, it is not possible to use the same control plunger in different types of mixing valves without providing for different movements of the control member.

In addition, in the case of the known mixing valves it is not possible to continuously limit or fix the movements of the control plunger both in an axial direction and in the direction of rotation. This would be advantageous in the case of a universally applicable mixing valve as it is necessary to limit the mixing temperature or the quantity of water, or both, for certain applications.

SUMMARY OF THE INVENTION

The object of the present invention is to construct a mixing valve in such a way that the control plunger can be used for different types of mixing valves, but in which it is always controlled in the same manner. In addition, it should also be possible to universally limit the plunger movement by means of adjustable stops.

This problem can be solved by means of a control plunger through which water passes, i.e., into which water flows substantially radially and is again discharged radially. A mixing valve of this type is smaller than the known mixing valves and is simpler and less expensive to produce.

The mixing valve according to the invention is characterized in that the supply lines and the outflow discharge substantially radially into a median portion of the housing bore in such a way that the flow component of the water which flows between the supply lines and the outflow is greater in a transverse direction with respect to the housing bore than in an axial direction thereto, in that the part of the control plunger which is located in this median portion comprises a reduction and is equipped with sealing ribs on both sides thereof and in that adjustable limit means are provided for limiting the movement of the plunger.

As a result of this configuration, axial displacement of the control plunger can either be used to control the mixing ratio or to control the delivery quantity. As a result, with the control plunger installed in any given horizontal or vertical position, it is always possible to use the vertical movement of the control lever or movement of the control lever away from and towards the user, for quantity control, as has become the general rule in the case of these mixture valves. Another advantage of the configuration of the control plunger according to the invention consists in that all parts which are subject to wear are rigidly connected to the control plunger such that it can easily be interchanged if a drip occurs owing to wear of the sealing elements.

Other objects, features and advantages of the present invention will be made apparent in the course of the following detailed description thereof provided with reference to the accompanying drawings which show purely diagrammatic views of mixing valves according to the invention and variants thereof.

BRIEF DESCRIPTION OF THE DRAWINGS

FIG. 1 is a cross-section of a mixing valve intended for vertical installation along the line A—A in FIG. 2.

FIG. 2 is a longitudinal sectional view along the line B—B in FIG. 1.

FIG. 3 is a cross-section along the line C—C in FIG. 2.

FIG. 4 is a cross-section along the line D—D in FIG. 2.

FIG. 5 is a cross-section of a mixing valve intended for horizontal installation along the line E—E in FIG. 6.

FIG. 6 is a longitudinal section along the line F—F in FIG. 5.

FIG. 7 is a development of the surface of the control plunger during temperature control through axial displacement of the same.

FIG. 8 shows the same development as FIG. 7 but in the case of temperature control through rotation of the control plunger.

FIGS. 9 and 10 are two views of a mixing valve for vertical installation.

FIGS. 11 and 12 are two views of a mixing valve for wall installation.

FIG. 13 is a longitudinal sectional view through the end part of another mixing valve.

FIG. 14 is a cross-section through the end part along the line XIV—XIV according to FIG. 13.

FIG. 15 is a diagrammatic cross-section view through another variant of the present invention showing a different form of a control plunger, and FIG. 16 is a diagrammatic cross-sectional view through another embodiment incorporation a control piston according to that of FIG. 15 in a mixing valve for wall installation.

DESCRIPTION OF THE PREFERRED EMBODIMENTS

The mixing valve represented in FIGS. 1–4 comprises a housing unit 1, to which two supply connections 2, 3 for hot and cold water, and an outflow member 4 for mixed water, are attached. The housing unit 1 contains an axial bore 5 whose wall, at the discharge points of the supply connections 2, 3 and 4, comprises bores 7, 8, 9, whose cross-section corresponds to the inner cross-section of the discharge orifices of the connections 2, 3 and 4; the bores 7, 8 and 9 serving as control orifices. A bulb-shaped control plunger 10 is disposed in the axial bore 5. The control plunger 10 comprises a central recess 11 in the form of a circular segment whose width in the axial direction is greater than the inside diameter of the discharge member 4. Soft sealing ribs 12-14, which rest in a seal-tight manner on the inner surface of the bore 5, are mounted on the outer surface of the control plunger 10.

An exemplary rib arrangement is represented in development in FIGS. 7 and 8. Although individual intermediate ribs can also be differently arranged, it is essential that sealing ribs 13 completely enclose the recess 11 and that sealing ribs 14, which are spaced apart from the recess 11, extend about the entire periphery of the control plunger 10 so that water cannot penetrate into the housing parts on either side of the control plunger. Sealing ribs 13 and sealing ribs 14 therefore define a connected net of sealing ribs in which case ribs 13 constitute an inner endless sealing rib net portion completely enclosing recess 11, while sealing ribs 14 which are connected thereto by rib net portions which extend both longitudinally and transversely from the sealing ribs 13 define an outer endless sealing rib net portion which is spaced from the inner endless sealing rib net portion. As shown in FIG. 7, the bores 7, 8 and 9 discharge in the housing 1 in a cylindrical outer surface which may be of corresponding size to or smaller than the rectangular cylindrical outer surface 11a of the recess 11 represented in development.

A closure cap 15 is rotatably inverted on the housing part 6 on one side of the housing unit and a slotted end of the control plunger 10 projects into the cap 15. A lever 16 serving as the actuating member for the mixing valve fits in a bore 17 of the cap 15 and in a bayonet groove 18 of the housing part 6 and the end 19 of the lever is so mounted in the slot of the control plunger 10 as to be pivotable in an axial direction of the latter. The lever is secured by means of a bolt 21 which passes through the shank of the slot 20. The lever 16 comprises a spherical part 22 which is guided in the groove 18. When the lever 16 is pivoted about the spherical part 22 in an axial direction, the control plunger is axially displaced in the housing 1. However, the lever 16 can also be pivoted at right angles to the axial direction together with the cap 15; the spherical part 22 of the lever being guided in the bayonet groove 18. As a result, the control plunger 10 is rotated about its longitudinal axis.

To limit the rotation and longitudinal displacement of the control plunger 10, the latter is equipped with an inner denticulation 23 at its opposite end to the gripping end; an outwardly denticulated part 25 of a rotation limiting element 24 being inserted in the inner denticulation 23.

The control plunger 10 is non-rotatably but longitudinally displaceably connected to the element 24. The element 24 comprises two wings 24a which cooperate with two stops 26 in the housing unit 1. The stops 26 correspond to the a "open" and z "closed" positions of the actuating lever 16. The pivot zone α of the lever 16 is so limited by the element 24 that the lever cannot be removed from the bayonet groove 18 and that the control openings 7, 8, 9 cooperate with the recess 11 in the desired manner. A screw 28, which is adjustable in an axial direction, is provided inside the element 24; the axial limit of the control plunger 10 is regulatable by means of the screw 28.

The element 24 is secured in the housing 1 by the closure cover 29 which is attached by means of screws in such a way that it is limitedly rotatable but axially non-displaceable.

The mode of operation of the mixing valve shown in FIGS. 1-4 is as follows: in the central position of the control plunger 10 shown in FIGS. 1 and 2, cold and hot water flows in equal amounts through the recess 11 into the water outlet 4, from which mixed water having an intermediate temperature is discharged. To vary the temperature of the mixed water, the lever 16 is pivoted to the right or left. In the two end positions of the lever 16 defined by the screw 28 and the lever 16 in the groove 18, either only cold water or only hot water flows from the water outlet 4. The delivery quantity can be varied in each position of the lever 16 by pivoting the latter in a plane at right angles to the control plunger axis. If the control plunger is pivoted until the recess 11 is no longer in communication with the openings 7 and 8, the outflow is completely interrupted. FIG. 7 is a view in development of the control plunger of this form of mixing valve.

However, the same control plunger 19 can also be used when the temperature is to be varied by rotating the control plunger and altering the outflow quantity through axial displacement of the same. FIGS. 5 and 6 show sectional views of this arrangement and FIG. 8 is a view in development thereof; the control orifices 7, 8 and 9 also being indicated. The arrows a and z indicate the direction of movement for obtaining a temperature variation in terms of "hot" or "cold".

Similarly, in FIGS. 9-12, the double arrows a-z and w-k indicate the direction of movement of the actuating lever 16 in the case of different embodiments of the mixing valve.

The valve according to the invention possesses the following substantial advantage over the known mixing valves. The axial displacement of the control plunger—depending on the form of the valve—can be used both to control temperature and quantity and the configuration of the control plunger remains the same for all embodiments, which simplifies manufacture and maintenance thereof.

Owing to the fact that the liquid flow is directed at right angles to the axial direction of the control plunger, the mixing valve can be relatively short. As stated, as a result of the above-described configuration of the control plunger 10, the lever 16 is in all cases actuated in the same direction in order to control the outflow quantity and outflow temperature.

In FIGS. 1, 2, 5 and 6 the sealing ribs 12-14 are represented as being spaced apart from the outer side of a rubber covering which covers the entire control plunger and only leaves free the recess 11.

The actuating mechanism of the control plunger could obviously be differently designed in order to produce the necessary axial and rotary movement.

FIGS. 13 and 14 represent further embodiments of the means for adjustably limiting the movement of the plunger. The rotation limiting element comprises a headed screw 50 which is screwed in a threaded bore 51 of the base of the plunger and whose shaft penetrates a slot 52 in the housing base 53. The slot 52 possesses a circular sectional form and thus the headed screw 50 is guided in the slot 52 during rotation of the plunger 10. Two grub screws 54, 55 are provided in the housing base 53 for the purpose of limiting rotation. The axes of the grub screws 54, 55 are disposed in the plane of the slot 52 and the ends thereof penetrate substantially tangentially into the slot ends. These grub screws 54, 55 act as stops for the shaft of the headed screw 50. By means of this configuration it is possible to continuously adjust the two end positions of the rotational movement of the plunger.

The headed screw 50 is simultaneously used for the continuous adjustment of the one axial limit means of the plunger 10 as the underside 56 of the screw head 57 can rest against the housing base 53 at the end of the axial movement. The position of this axial stop can thus be varied by rotating the screw 50.

The other axial stop is limited by the screw 58 which is guided in an axial direction in the housing base 53. The end of the screw 58 forms a stop for the base of the plunger.

The end part of the housing 1 is covered by a covering hood 59. All the screws 50, 54, 55, 58 are rendered accessible by removing the covering hood. As a result, limitation of the plunger movement can be effected without interrupting operation. The limiting elements are disposed outside of the water-bearing mixing chamber of the valve limited by the sealing ribs 14.

FIGS. 15 and 16 show additional embodiments of the invention including another form of the control plunger 10. In these embodiments the reduced portion 10b is so designed that two recesses 60, 61 are provided in the plunger. In FIG. 15 the control plunger is incorporated in a mixing valve and in FIG. 16 it is incorporated in a mixing valve for wall installation. In FIG. 15 the control piston is represented in the fully open position and in FIG. 16 in the closed position.

The afore-mentioned mixing armature comprises the following additional advantages:
- the unit consisting of the control plunger and the operating handle which is hingedly connected therewith can be used in its existing form with the same actuating directions both when the control plunger axis is disposed parallel to the wall and also when it is disposed at right angles to the wall;
- the end stops for limiting the control movements (beginning and end of the rotational movement and beginning and end of the axial movement) can be adjusted individually; in the case of individual embodiments—continuously;
- the four regulating screws provided in one embodiment can be rendered accessible without interrupting operation by removing a protective hood;
- the arrangement of the four regulating screws can be provided with minimal manufacturing costs; in addition to a threaded hole, only a circular slot is required;
- by means of the control plunger comprising only one recess, the same actuating directions can be used for both quantity regulation and temperature regulation both when the control plunger axis is disposed parallel to the wall and when it is disposed at right angles to the wall; these actuating directions consisting of the left for "cold" and right for "hot";
- when the control plunger comprises two oppositely disposed recesses and the operating lever is disposed in the plane of symmetry of these recesses, a type of mixing valve is provided wherein—given that the control plunger is installed at right angles to the wall—the lever is directed to the left for hot and to the right for cold.

What is claimed is:

1. A mixing valve for hot and cold water comprising:
   a housing including an axial bore,
   two delivery pipes and one outlet, said pipes and said outlet radially intersecting said bore, within said housing,
   a control plunger axially, slidably and rotatably installed within said bore of said housing and being recessed on its periphery intermediate of its ends to form a transverse flow passage,
   at least one control element for adjusting the volume of discharge and the discharge temperature of said mixing valve and being operatively coupled to said control plunger for axially shifting said plunger within said bore and for rotating said plunger about its axis,
   the improvement comprising:
   a net of connected sealing ribs carried on the surface of the control plunger, said recess being surrounded on all sides by portions of said sealing ribs, said net of connected sealing ribs including an inner endless rib net portion outlining said recess on said control plunger periphery and an outer sealing rib net portion spaced therefrom and surrounding said inner endless rib net portion and being connected thereto by spaced longitudinal and transverse connecting sealing ribs, said pipes and said outlet being sized less than the width of said control plunger recess, and
   means carried by said housing for adjustably limiting movement of said plunger axially and rotatably and lying outside of said outer endless sealing rib net portion;
   whereby, said limitation adjustment means may be adjusted without interrupting water flow to said delivery pipes of said mixing valve.

2. A mixing valve as claimed in claim 1, wherein said two delivery pipes and the outlet are disposed at right angles to the axis of the control plunger and their axes are disposed in the same plane as the axis of the control plunger.

3. A mixing valve as claimed in claim 1, wherein said sealing ribs comprise a one piece sealing part.

4. A mixing valve as claimed in claim 1, wherein said net of sealing ribs comprises a sealing part approximately cylindrical in shape and surrounding the control plunger and having radially projecting protrusions.

5. A mixing valve as claimed in claim 1, further comprising an arcuate groove within said housing, said cautoal element comprising a lever projecting through said housing radially and bearing a part within said groove and being guided thereby, and a securing element mounted to said housing and rotatable with said plunger to limit the field of traverse of said lever to an arcuate distance less than the circumferential length of said groove.

6. A mixing vlave as claimed in claim 1, wherein said means for limiting rotation of said plunger and for limiting the axial movement of said plunger comprise individual elements located at one end of said housing.

7. A mixing valve as claimed in claim 6, wherein said element for limiting rotation includes an axial tap bolt, said plunger includes a plunger head, said axial tap bolt in screwed into said plunger head, a slot is carried within said housing having a shape of a circle with said tap bolt projecting through said slot, a pair of adjustment bolts are screwed into said housing and penetrate tangentially into respective ends of said arc shaped slot for limiting movement of said tap bolt which rotates with said plunger.

8. A mixing valve as claimed in claim 7, wherein the elements for limiting axial movement of the control plunger comprise the head of the tap bolt and a second bolt extending parallel to the axis of the plunger is threaded to one end of the housing and acts as a stop for said plunger head.

* * * * *